June 18, 1946.  J. S. SILVER  2,402,350
FLOW MEASURING APPARATUS
Filed July 1, 1944
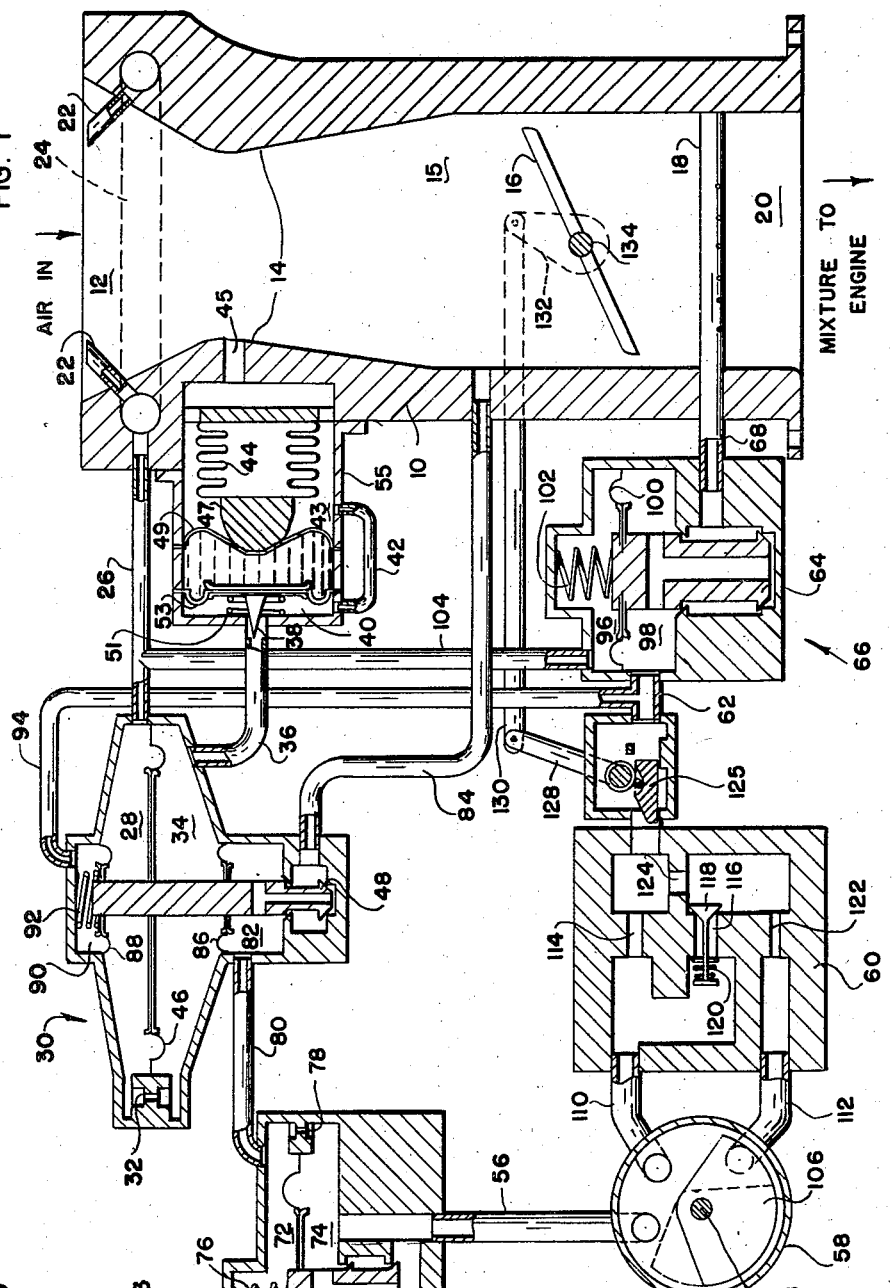
INVENTOR.
J. S. SILVER
BY
Lester W Clark
AGENT Patented June 18, 1946

2,402,350

UNITED STATES PATENT OFFICE 2,402,350

FLOW MEASURING APPARATUS

Jacob S. Silver, Bridgeport, Conn., assignor to Chandler-Evans Corporation, South Meriden, Conn., a corporation of Delaware Application July 1, 1944, Serial No. 543,177

6 Claims. (Cl. 73—202)

1

The present invention relates to valve mechanism, and particularly to a valve mechanism adapted for use in compensating the action of a carburetor for an internal combustion engine for variations in air density.

A carburetor may be defined as a device for controlling the fuel-to-air ratio of the charge supplied to the cylinders of an internal combustion engine. In order to control the proportions of the charge, certain types of carburetors now in common use on aircraft utilize means for measuring the air flow, means for measuring the fuel flow, and means for comparing the air and fuel flows and controlling the fuel flow so as to correct it if it is not in the desired proportion with respect to the air flow.

Since aircraft must operate at different altitudes and at widely varying temperatures, the pressure and temperature, and hence the density, of the air entering the engine varies widely. In order to maintain a given fuel-to-air ratio, the mass of fuel must be proportioned to the mass of air entering the engine. Therefore, the device which measures the air flow must measure the mass of air flowing per unit time rather than the velocity of the flowing air.

The most common device used to measure air flow is the Venturi meter. In accordance with the laws of fluid flow, a Venturi meter produces a pressure differential which varies as a function of the velocity of the fluid flowing thru it. If the device is to measure the mass of the flowing air, the pressure differential produced by the Venturi meter must be corrected for variations in air density.

A correction for air density has been obtained in the past by utilizing a sealed bellows filled with a temperature responsive fluid to operate a valve controlling the flow of air thru a passage wherein the air flow is induced by the pressure differential set up by the Venturi meter.

The valve operated by the bellows must control the area of the valve opening as a rather complicated function of the pressure and temperature of the air surrounding the bellows. It has been the practice in the past to grind these valves with an empirically determined irregular contour. Since these valves are rather small, being on the order of ⅜ of an inch in diameter, the problem of grinding these valves with a special irregular contour has proven very difficult, especially where mass production of carburetors is desired.

It is, therefore, an object of the present invention to provide a valve mechanism which

2 may be given a regular contour and operated with its travel varying as a predetermined function of the travel of a control element such as an expansible bellows.

Another object of the invention is to provide a hydraulic connection between a bellows and a valve operated by it, and means for controlling the effective length of the connection as a function of the bellows position.

Other objects and advantages of the present invention will become apparent from a consideration of the appended specification, claims and drawing, in which Figure 1 represents, somewhat diagrammatically, a carburetor for an internal combustion engine embodying the principles of my invention, and Figure 2 represents a portion of the carburetor of Figure 1, with the parts in a different position.

Referring to the drawing, there is shown a body 10 of a carburetor for an aircraft type internal combustion engine. Air enters the carburetor body 10 at an inlet 12 and flows thru a Venturi restriction 14 and a passage 15, past a throttle 16 and a fuel discharge nozzle 18 to an outlet 20. A supercharger may be provided between the outlet 20 and the intake manifold of the engine. In certain cases the supercharger may be upstream from the inlet 12, or two superchargers may be used, one in each place.

The Venturi restriction 14 produces a pressure differential between the inlet 12 and the throat of the restriction which varies substantially in accordance with the square of the velocity of the air passing thru the restriction. Since the cross-sectional area of the venturi is constant, this pressure differential may be taken as a measure of the volume of air flowing thru the passage per unit time.

In order to obtain a pressure differential varying as a function of the mass of air per unit time flowing thru the venturi 14, the pressure differential between entrance 12 and the throat of venturi 14 is utilized to create an air flow thru a secondary air passage extending from entrance 12 to the throat of venturi 14. A plurality of impact tubes 22 are provided, whose open ends project into the entrance 12 to receive the impact of the entering air. The secondary air passage may be traced from entrance 12, thru tubes 22, a passage 24 interconnecting the impact tubes, a conduit 26, a chamber 28 in a pressure meter generally indicated at 30, a restriction 32, a chamber 34 in the pressure meter 30, a conduit 36, past a valve 38 into a chamber 40, a conduit 42, a chamber 43, and thence thru a conduit 45 to the throat of venturi 14.

The valve 38 is operated by a sealed bellows 44 mounted in the chamber 43. The bellows 44 is fixed at one end, so that the position of the free end varies in accordance with the air pressure in the chamber 43. The bellows 44 is preferably filled with nitrogen or some other suitable temperature responsive fluid, so that the expansion and contraction of bellows 44 varies not only with the pressure but with the temperature of the air in the chamber 43, and hence with the density of that air.

A plunger 47 is mounted on the free end of bellows 44. The plunger 47 is contoured in accordance with a predetermined function of the travel of the bellows 43, as explained in detail hereinafter. The projecting end of plunger 47 acts against a flexible elastic diaphragm 49, which is rigidly attached at its edges to a casing 55. The valve 38 is attached to the center of a second flexible diaphragm 53, also attached at its edges to casing 55. The chamber formed by the diaphragms 49 and 53 and the casing 55 is filled with a suitable nonexpansible liquid. Each motion of the diaphragm 49 therefore produces a corresponding motion of diaphragm 53. A spring 51 biases diaphragm 53 to the right, and thereby maintains diaphragm 49 in contact with the end of plunger 47. The valve 38 has a regular contour, so that equal increments of motion of the valve cause equal increments of valve opening. It will be seen that the displacement of diaphragm 53, and hence the distance moved by the valve, for a given travel of bellows 44, depends on the contour of plunger 47. Figure 2 illustrates the valve and plunger in a different position from that shown in Figure 1.

It should be noted that the plunger 47 is of considerably greater diameter than the valve 38. Therefore, an error of given magnitude in the dimensions of plunger 47 represents a smaller percentage error that does an error of the same magnitude in the dimensions of valve 38. The valve 38 is given a regular contour which is relatively easy to form and not so subject to errors in manufacture. The careful contouring is done on the plunger 47, of relatively large diameter, where a greater tolerance of error is permissible.

In the secondary air passage, the pressure differential between the entrance 12 and the throat of venturi 14 is divided into two component pressure drops, one across the restriction 32 and the other across the valve 38. The valve 38 is positioned in accordance with the pressure of the air flowing thru the passage 15. Valve 38 is moved toward open position as the air pressure increases and toward closed position as the air pressure decreases. If the volume of air flowing per unit time thru passage 15 remains constant while its pressure decreases, then the mass of air is decreased, but the pressure differential set up by the venturi 14 remains constant. However, the movement of valve 38 toward closed position causes the component pressure drop across valve 38 to increase, and the component pressure drop across restriction 32 to decrease proportionately, reflecting the decrease in the mass of air flowing per unit time.

The bellows 44 responds to changes in temperature of the air in chamber 40 in a similar manner. An increase in temperature of that air causes an expansion of bellows 44 and so reduces the pressure drop across restriction 32 to compensate for the decrease in density of the air accompanying its increase in temperature.

Since the volume of bellows 44 is different for each value of external pressure, it may be seen that the bellows produces a different travel of valve 38 per unit change in temperature for each different value of pressure. At sea level, the air pressure is relatively high, the bellows 44 has a small volume and, therefore, produces a relatively small travel per degree change of temperature. At high altitudes, and consequent low atmospheric pressures, the bellows 44 has a relatively large volume and hence produces a larger travel per degree change in temperature. Under those circumstances, its effect is to overcompensate for changes in temperature. In other words, instead of correcting the inherent tendency of the carburetor to produce too rich a mixture as the air density increases due to increase in temperature, the valve 38 under those circumstances overcorrects and causes the carburetor to produce too lean a mixture.

Therefore, with a single element responsive to both pressure and temperature, such as bellows 44, the valve 38 cannot be made to compensate exactly for all conditions of temperature and pressure which may be encountered. Consequently, the relationship between the travel of the free end of bellows 44 and the open area at valve 38 must be a compromise function of a rather complicated nature, which depends on the characteristics of the bellows, and on the particular ranges of pressure and temperature at which the carburetor is desired to operate, which ranges vary considerably in different types of aircraft.

The prior devices of this type, where the bellows operates the valve directly, the valve must be very carefully contoured in order to provide the desired relationship between the bellows travel and the valve area. Since the valve is quite small, a small error in the valve dimensions may make a large error in the compensating effect obtained from the valve. Consequently, mass production of such valves and of carburetors using such valves, is difficult.

In the present device, however, the valve is given a smooth conical contour which is relatively easy to produce and duplicate without substantial error, while the careful contouring is done on the relatively large plunger 47, where a greater tolerance of manufacturing error may be allowed. By proper design of plunger 47 and valve 38, the pressure drop across restriction 32 may be made to vary substantially in accordance with the mass of air flowing thru passage 15 under most of the temperature and pressure conditions commonly encountered. This pressure differential across restriction 32 acts on a diaphragm 46 which separates the chambers 28 and 34. The force applied to diaphragm 46 is transmitted to a valve 48, on which it acts in a closing direction.

The fuel enters the carburetor from a fuel pump or other source of fuel under superatmospheric pressure. It flows thru a conduit 50, a valve 52 in a pressure regulator generally indicated at 54, a conduit 56, a mixture control generally indicated at 58, a jet system 60, an idle valve 125, a conduit 62, a valve 64 in a second pressure regulator 66, and a conduit 68 to the fuel discharge nozzle 18.

The pressure regulator 54 includes a diaphragm 70 separating a pair of expansible chambers 72 and 74 and connected at its center to the valve 52. A spring 76 biases the valve 52 toward open position. A restriction 78 connects the chambers 72 and 74.

A portion of the fuel entering pressure regulator 54 flows thru chamber 74, restriction 78, chamber 72, a conduit 80, a chamber 82 in the pressure meter 30, past the valve 48, and thru a conduit 84 to the main air passage 15.

The pressure meter 30 includes a diaphragm 86 separating the chambers 34 and 82 and a diaphragm 88 separating the chamber 28 from a fourth expansible chamber 90. The valve 48 is biased toward closed position by a spring 92.

The chamber 90 is connected thru a conduit 94 to the fuel conduit 62 downstream from the jet system 60. The pressure in chamber 90 is therefore the same as that in the fuel line downstream from the jet system. The pressure in chamber 82 is the same as that in chamber 72 of pressure regulator 54.

The position of diaphragm 70 and valve 52 is determined by the balance between the spring 76 plus the pressure in chamber 72 acting in a valve opening direction and the pressure in chamber 74 acting in a valve closing direction. If the balance between these forces is upset, the diaphragm 70 and valve 52 move until the balance is restored. Therefore the pressure in chamber 72 is a measure of the pressure in chamber 74, which is substantially the same as the pressure on the upstream side of the jet system 60. For any given constant cross-sectional area of the fuel passages thru the jet system 60, the pressure differential across it is a measure of the fuel flow thru it. This pressure differential, or rather a smaller pressure differential which is a measure of the pressure differential across the jet system, is applied thru the diaphragms 86 and 88 of pressure meter 30 to the valve 48, on which it acts in an opening direction.

From the foregoing, it may be seen that the valve 48 is positioned in accordance with the balance between two forces, one of which varies in accordance with the mass of air entering the carburetor, and the other in accordance with the mass of fuel entering the carburetor. Furthermore, the valve 48 controls the mass of fuel entering the carburetor, since it controls the pressure in chamber 82. The pressure in the chamber 82 is transmitted to chamber 72 of pressure regulator 54 where it controls the position of valve 52 and hence the pressure on the upstream side of the jet system 60.

The pressure regulator 66 operates to maintain a substantially constant pressure on the downstream side of the jet system 60 and thereby to prevent variations in pressure at the fuel discharge nozzle 18, which may be due to operation of the throttle or to variations in engine speed, from reaching the downstream side of the jet system and affecting the fuel flow.

The pressure regulator 66 includes a pair of expansible chambers 96 and 98 separated by a flexible diaphragm 100, which is attached at its center to the valve 64. A spring 102 biases the valve 64 toward closed position. The chamber 96 is connected thru a conduit 104 to the conduit 26 and thence thru the passage 24 and impact tubes 22 to the air entrance 12. The chamber 98 is connected to the conduit 62.

The mixture control 58 includes a disc valve 106 fixed on a shaft 108. The disc valve 106 controls the flow of fuel thru ports opening into conduits 110 and 112 which lead into the jet system 60. When the disc 106 is in the position illustrated in full lines in the drawing, fuel can flow to the jet system only thru the conduit 110. This full line position of the disc valve 106 is known as the "lean" position of the mixture control 58. When the disc valve 106 is in the dotted line position shown in the drawing, the fuel can flow thru both the conduits 110 and 112. The dotted line position of disc valve 106 is termed the "rich" position of the mixture control. The disc valve 106 can also be moved to a "cut-off" position wherein it cuts off the flow thru both conduits 110 and 112.

The conduit 110 conducts fuel either thru a fixed restriction or jet 114, or thru a restriction 116 controlled by a valve 118 biased to closed position by a spring 120. The conduit 112 conducts fuel to a fixed restriction 122. Fuel flowing thru the restrictions 116 and 122 also flows thru another restriction 124 which limits the total flow thru restrictions 116 and 122.

The valve 118 is normally closed, but opens at high pressure differentials across the jet system to increase the fuel-to-air ratio under heavy load conditions.

At low air flows such as are encountered under idling conditions, the pressure differential set up by the venturi 14 tends to be erratic, and is not a reliable indication of the volume of air entering the engine. Provision is made to control the fuel flow directly in accordance with the throttle position at such times. The spring 92 in the pressure meter 30 acts on valve 48 in a closing direction. When the differential pressure acting on diaphragm 46 is small, as under low air flow conditions, the spring 92 becomes the predominating force acting on valve 48. A closing movement of valve 48 causes an increase in the fuel flow thru the main fuel line, since the closure of valve 48 increases the pressure in chamber 82 of pressure meter 30 and hence in chamber 72 of pressure regulator 54. Furthermore, the spring 76 of pressure regulator 54 biases valve 52 in an opening or fuel flow increasing direction.

The idle valve 125 is pivotally attached to a lever 128, whose opposite end is connected by a link 130 to an arm 132 fixed on the shaft 134 of throttle 16. The idle valve is normally wide open when the throttle is beyond a range of positions near its closed position, usually termed the idling range. As the throttle moves into the idling range, thereby decreasing the air flow, the idle valve 125 moves toward closed position. At the same time, the springs 92 and 76 cause operation of valve 52 in an opening direction. The valve 52 is thereby opened sufficiently so that its restrictive effect on the fuel flow is less than that of the idle valve 125. Therefore fuel flow under idling conditions is controlled primarily by the valve 125 in accordance with the position of the throttle, and not by the pressure meter 30 in accordance with the mass of air entering the engine.

Although I have illustrated a particular type of carburetor, it will be appreciated by those skilled in the art that my invention may be applied with equal facility to other types of carburetors. The carburetor illustrated may, for example, be modified by omitting the pressure regulator 54 and placing the valve 48 of the pressure meter 30 directly in the fuel line between the pump and the mixture control 58.

While I have shown and described a preferred embodiment of my invention, other modifications thereof will readily occur to those skilled in the art, and I therefore intend my invention to be limited only by the appended claims.

I claim as my invention:

1. Apparatus for measuring the flow of a fluid of variable density, comprising a conduit for said fluid, means associated with said conduit for producing two unequal pressures whose difference is a measure of the velocity of the flowing fluid, a passage connecting spaced points in said conduit subject to said two unequal pressures so that a flow of fluid is induced therein by the difference of said pressures, at least two restrictions in series in said passage, means for varying one of said restrictions including a valve and seat contoured so that substantially uniform increments of valve movement produce substantally uniform increments of opening between said valve and seat, a closed liquid-filled chamber including a first flexible diaphragm forming a wall of said chamber and connected to said valve for movement therewith and a second flexible diaphragm forming a second wall of said chamber, a flexible bellows responsive to one of said two unequal pressures, a plunger positioned by said bellows and engaging said second diaphragm, said plunger being contoured in accordance with a predetermined function of the density of said fluid so that each increment of travel of said bellow produces an increment of valve movement whose magnitude is determined by the contour of said plunger, and means for measuring the pressure differential across one of said restrictions.

2. Means for operating a valve as a predetermined function of a variable pressure, comprising a flexible bellows responsive to said pressure and having one end fixed and the other end movable in accordance with said pressure, a plunger carried by the free end of said bellows and having its projecting end contoured so that its diameter increases in accordance with said function from the tip of said projecting end toward said bellows, a closed liquid-filled chamber, a pair of flexible diaphragms forming spaced walls of said chamber, one of said diaphragms lying adjacent the projecting end of said plunger, spring means acting on the other diaphragm in a direction to hold said one diaphragm in engagement with said plunger, the strength of said spring and the flexibility of said one diaphragm being so related that the area of contact between said one diaphragm and said plunger is progressively increased as said plunger is moved toward said one diaphragm by said bellows, said one diaphragm being so spaced from said bellows in relation to the travel of said bellows that said one diaphragm engages only the contoured end of said plunger, and means carried by the other of said diaphragms for operating said valve so that each increment of travel of said bellows produces an increment of movement of the valve whose magnitude depends on the contour of said plunger.

3. A valve mechanism to be operated as a predetermined function of a variable pressure, comprising a valve and seat contoured so that substantially uniform increments of valve movement produce substantially uniform increments of opening between said valve and seat, a closed liquid-filled chamber, a first flexible diaphragm forming a wall of said chamber and connected to said valve for movement therewith, a second flexible diaphragm forming a second wall of said chamber, a flexible bellows responsive to said pressure, and a plunger positioned by said bellows and having one end engaging said second diaphragm, said one end of said plunger being contoured so that its diameter increases in accordance with said function as the distance from the tip of said end increases, the length of said contoured end along the axis of said plunger being greater than the travel of said plunger so that said second diaphragm engages only the contoured end, said second diaphragm being sufficiently flexible that the area of contact between said second diaphragm and said plunger is progressively increased as said plunger is moved toward said diaphragm, whereby each increment of travel of said bellows produces an increment of valve movement whose magnitude is determined by the contour of said plunger.

4. A valve mechanism to be operated as a predetermined function of a variable pressure, comprising a valve and seat of substantially circular cross-section contoured so that uniform increments of valve movement produce uniform increments of opening between said valve and seat, a closed liquid-filled chamber, a first flexible diaphragm forming a wall of said chamber and connected to said valve for movement therewith, a second flexible diaphragm forming a second wall of said chamber, a flexible bellows responsive to said pressure, and a plunger of substantially circular cross-section positioned by said bellows and having one end engaging said second diaphragm, said plunger having a cross-sectional area greater than that of said valve and seat and being contoured so that its diameter increases in accordance with said function as the distance from the tip of said end increases, the length of said contoured end along the axis of said plunger being greater than the travel of said plunger so that said second diaphragm engages only the contoured end, said second diaphragm being sufficiently flexible that the area of contact between said second diaphragm and said plunger is progressively increased as said plunger is moved toward said diaphragm, whereby each increment of travel of said bellows produces an increment of valve movement whose magnitude is determined by the contour of said plunger.

5. Valve mechainsm to be operated as a predetermined function of a variable pressure, comprising a valve and seat contoured so that substantially uniform increments of valve movement produce substantially uniform increments of opening between said valve and seat, a closed liquid-filled chamber, a first flexible diaphragm forming a wall of said chamber and connected to said valve for movement therewith, a second flexible diaphragm forming a second wall of said chamber, a flexible bellows responsive to said pressure, and a plunger positioned by said bellows and having one end engaging said second diaphragm, said plunger having a minimum cross-sectional area substantially greater than that of said valve and seat and being contoured so that its diameter increases in accordance with said function as the distance from the tip of said end increases, the length of said contoured end along the axis of said plunger being greater than the travel of said plunger so that said second diaphragm engages only the contoured end, said second diaphragm being sufficiently flexible that the area of contact between said second diaphragm and said plunger is progressively increased as said plunger is moved toward said diaphragm, whereby each increment of travel of said bellows produces an increment of valve movement whose magnitude is determined by the contour of said plunger.

6. Valve mechanism to be operated as a predetermined function of the travel of a movable element, comprising, a valve, a closed liquid-filled chamber, a first flexible diaphragm forming a wall of said chamber and connected to said valve for movement therewith, a second flexible diaphragm forming a second wall of said chamber, and a plunger positioned by said element and having one end engaging said second diaphragm, said one end of said plunger being so contoured so that its diameter increases in accordance with said function as the distance from the tip of said end increases, the length of said contoured end along the axis of said plunger being greater than the travel of said plunger so that said second diaphragm engages only the contoured end, said second diaphragm being sufficiently flexible that the area of contact between said second diaphragm and said plunger is progressively increased as said plunger is moved toward said diaphragm, whereby each increment of travel of said element produces an increment of valve movement whose magnitude is determined by the contour of said plunger.

JACOB S. SILVER.